(12) United States Patent
Nishikawa et al.

(10) Patent No.: US 8,507,073 B2
(45) Date of Patent: Aug. 13, 2013

(54) EXTERIOR PARTS

(75) Inventors: Yukio Nishikawa, Osaka (JP);
Masayuki Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/918,982

(22) PCT Filed: Jan. 22, 2009

(86) PCT No.: PCT/JP2009/000220
§ 371 (c)(1),
(2), (4) Date: Aug. 23, 2010

(87) PCT Pub. No.: WO2009/141934
PCT Pub. Date: Nov. 26, 2009

(65) Prior Publication Data
US 2011/0033670 A1    Feb. 10, 2011

(30) Foreign Application Priority Data

May 22, 2008    (JP) .................. 2008-133710

(51) Int. Cl.
B32B 3/00    (2006.01)
B32B 1/00    (2006.01)
G02B 5/18    (2006.01)
G03H 1/04    (2006.01)

(52) U.S. Cl.
USPC ........... 428/162; 428/161; 428/141; 428/174; 428/172; 359/576; 359/566; 359/567; 359/599; 430/322; 430/321; 430/1; 430/5; 430/325

(58) Field of Classification Search
None
See application file for complete search history.

(56) References Cited

U.S. PATENT DOCUMENTS

| 5,126,880 | A | 6/1992 | Wheatley et al. |
| 5,275,864 | A | 1/1994 | Kenmochi |
| 6,305,028 | B1 | 10/2001 | Lin |
| 7,074,463 | B2 * | 7/2006 | Jones et al. .................. 428/1.1 |
| 7,333,289 | B2 | 2/2008 | Kaizu et al. |

(Continued)

FOREIGN PATENT DOCUMENTS

| CN | 1838255 | 9/2006 |
| DE | 10 2005 006074 | 8/2006 |

(Continued)

OTHER PUBLICATIONS

Ansonia Copper & Brass Inc., Copper Alloy Data Sheet. http://www.ansoniacb.com/CDA%20Files/c18150.htm, Nov. 3, 2003.*

(Continued)

*Primary Examiner* — David Sample
*Assistant Examiner* — Nicole T Gugliotta
(74) *Attorney, Agent, or Firm* — Hamre, Schumann, Mueller & Larson, P.C.

(57) ABSTRACT

An exterior part (200) includes (a) a structure color generation portion (210) having a minute shape (structure color generation region (211)) formed therein, light in a visible light range being produced from the minute shape by a physical phenomenon such as interference or diffraction with the incidence of light, and (b) a resin portion (220) that is made of resin having a light transmitting property and serves as the outer surface of a product, (c) the structure color generation portion (210) and the resin portion (220) are formed by molding, and (d) the structure color generation portion (210) is made of resin different from the resin of the resin portion (220), and covered with the resin portion (220).

7 Claims, 7 Drawing Sheets

(56) References Cited

U.S. PATENT DOCUMENTS

| | | |
|---|---|---|
| 2002/0044356 A1 | 4/2002 | Arakawa et al. |
| 2005/0260386 A1 | 11/2005 | Heinrich et al. |
| 2008/0037131 A1* | 2/2008 | Steenblik et al. ............. 359/619 |
| 2008/0213541 A1* | 9/2008 | Schilling et al. ............. 428/161 |

FOREIGN PATENT DOCUMENTS

| | | | |
|---|---|---|---|
| EP | 1 705 638 | | 9/2006 |
| JP | 03-261600 | | 11/1991 |
| JP | 04-295804 | | 10/1992 |
| JP | 09-061601 | | 3/1997 |
| JP | 2002-362095 | | 12/2002 |
| JP | 2003-200468 | * | 7/2003 |
| JP | 2004-151271 | * | 5/2004 |
| JP | 2005-007624 | | 1/2005 |
| JP | 2006-516108 | | 6/2006 |
| JP | 2006-281740 | | 10/2006 |
| JP | 2007-261197 | | 10/2007 |
| WO | 2004-045866 | | 6/2004 |

OTHER PUBLICATIONS

Bradna, "Polymerization Synthetic Polymers used in Denstry", http://chel.lf1.cuni.cz/html/Polymers.pdf., slide 47, Apr. 30, 2006.*

Web Elements of the Periodic Table: Copper (Cu), physical properties, http://www.webelements.com/copper/physics.html. 1993-2012.* www.refractiveindex.com for PMMA and Copper (Cu).*

Kaminow et al., "Poly (methyl methacrylate) dye laser with internal diffraction grating resonator", Applied Physics Letters, vol. 18. No. 11, Jun. 1971.*

International Search Report of PCT/JP2009/000220, dated Mar. 17, 2009.

* cited by examiner

EXTERIOR PARTS

TECHNICAL FIELD

The present invention relates to an exterior part that configures the outer part of a product, and particularly to an exterior part that provides a decorative effect to a product.

BACKGROUND ART

Conventionally, as a molding method of an exterior part for providing a decorative effect to a molded product, a method is known in which characters or decorative lines are engraved on a mold surface and embossed on a molded surface, or graining or secondary fabrication after molding is performed. In particular, coloring is generally performed by painting, printing, or sticking on a molded product having a certain color, or special molding such as multicolor molding. However, coloring by these methods uses various pigments or dyes. Such coloring also uses organic solvents or requires post-treatment such as waste liquid treatment. This has increased problems in terms of both operations and the environment.

In response, techniques have been proposed on structural coloring using a physical phenomenon such as the interference or diffraction of light for coloring, instead of so-called coloring matters such as pigments or dyes. For example, there are a technique of alternately laminating two kinds of polymeric substances having different refractive indexes in multiple layers for coloring (for example, see Patent Document 1), a technique related to a fibrous coloring structure body having an alternately laminated structure made up of two kinds of polymeric substances having different refractive indexes (for example, Patent Document 2), and a technique related to a transfer sheet having a minute irregular surface (for example, see Patent Document 3). There is also a technique of forming a diffraction grating structure on a metal for coloring (for example, see Patent Document 4).

<Structural Coloring>

A transfer sheet using structural coloring will be described.

As shown in FIG. 13, a heat-resistant protective layer 42 made primarily of polyamide-imide resin having a glass transition point (Tg) of 250° C. is applied to a surface of a support 41. A diffraction structure forming layer 43 made primarily of urethane resin is applied to a surface of the heat-resistant protective layer 42. Then, a minute irregular pattern forming a diffraction grating is formed on a surface of the diffraction structure forming layer 43 by roll embossing.

Then, a metallic reflective diffraction effect layer 44 is formed on the surface of the diffraction structure forming layer 43 with the minute irregular pattern formed thereon. Further, a heat-resistant mask layer 45 is formed on a surface of the diffraction effect layer 44 by pattern printing. The article having the heat-resistant mask layer 45 formed therein is immersed in a bath containing an NaOH solution, and a portion of the diffraction effect layer 44 exposed from a portion free from the heat-resistant mask layer 45 is etched. Then, an adhesive layer 46 is formed on a surface of the heat-resistant mask layer 45 and a portion of the diffraction structure forming layer 43 exposed by the etching, so as to cover the heat-resistant mask layer 45 and the diffraction effect layer 44. Thus, a transfer sheet 40 is produced.

Patent Document 1: Japanese Patent Laid-Open No. 4-295804
Patent Document 2: Japanese Patent Laid-Open No. 2004-151271
Patent Document 3: Japanese Patent Laid-Open No. 2005-7624
Patent Document 4: National Publication of International Patent Application No. 2006-516108

DISCLOSURE OF THE INVENTION

Problems to be Solved by the Invention

However, the conventional techniques have problems described in (1) to (4) below.

(1) In Patent Document 1, a sheet material made of laminated polymeric substances produces the same coloring state within a certain area, and it is difficult to purposely form a fine pattern.

(2) In Patent Document 2, the fibrous coloring body is uniformly mixed into a molding material, and thus the same coloring state is produced within a certain area as in Patent Document 1.

(3) In Patent Document 3, a coloring state can be finely varied. However, the sheet is bonded by an adhesive, and hence may be delaminated and has a problem in durability. Further, it is difficult to bond the sheet to a complex surface shape. Moreover, the sheet material requires many production steps and a bonding step, which increases production cost.

(4) In Patent Document 4, a metal material is an object, and the diffraction grating structure may be contaminated to reduce the coloring property.

Thus, the present invention is achieved in view of the above-described problems, and has an object to provide an exterior part that prevents a reduction in the preserving property of a structure color generation portion with good design, and can be easily molded for a product having a complex surface shape at low cost.

Means for Solving the Problems

To achieve the above-described object, an exterior part according to the present invention includes the following features.

(C1) An exterior part according to the present invention is (a) an exterior part that configures the outer part of a product, and includes (b) a resin portion that is made of resin having a light transmitting property and serves as the outer surface of the product, and (c) a structure color generation portion having formed therein a minute shape from which light in a visible light range is produced by a physical phenomenon such as interference or diffraction with the incidence of light, wherein (d) the resin portion and the structure color generation portion are formed by molding.

Thus, for example, even if the outer surface of the product is rubbed with hands and worn, the resin portion is placed on the outer surface of the Product, and thus the structure color generation portion is protected by the resin portion and is not damaged. This can prevent a reduction in the preserving property of the structure color generation portion. The resin portion and the structure color generation portion are formed by molding, and thus the exterior part can be easily molded for a part having a complex surface shape at low cost, and the structure color generation portion with good design can be formed.

(C2) In the exterior part of (C1), the minute shape of the structure color generation portion may be formed by a periodic structure in which the same shape is repeated in a region having one side of 80 μm as a minimum light emitting unit.

(C3) In the exterior part of (C2), the minute shape of the structure color generation portion may be peaks and troughs.

(C4) In the exterior part of (C3), the minute shape of the structure color generation portion may have an interval of 0.4 to 0.7 μm between the troughs or the peaks.

(C5) In the exterior part of (C3), the minute shape of the structure color generation portion may have a draft angle of 6° to 82° for molding.

(C6) In the exterior part of (C3), the minute shape of the structure color generation portion may have a height of 0.05 to 3.3 μm, and the height may be ten times or less than an interval between a peak and a trough.

(C7) In the exterior part of (C2), the minute shape of the structure color generation portion may be a minute through hole shape.

(C8) In the exterior part of (C7), a distance between the center of a hole and the center of an adjacent hole is 0.4 to 0.7 μm in the minute through hole shape.

(C9) In the exterior part of (C1), the resin portion and the structure color generation portion may be the same, and the minute shape may be formed on the inner surface of the resin portion.

(C10) In the exterior part of (C9), a step may be formed on the periphery of the structure color generation portion so as to protrude inward of the product rather than the structure color generation portion.

(C11) In the exterior part of (C1), the structure color generation portion may be made of resin different from the resin of the resin portion, and covered with the resin portion.

(C12) In the exterior part of (C11), the minute shape may be formed on the surface of the structure color generation portion in contact with the resin portion.

(C13) In the exterior part of (C11), the softening temperature of the structure color generation portion may be higher than the softening temperature of the resin portion.

(C14) In the exterior part of (C11), the reflectivity of the structure color generation portion may be higher than the reflectivity of the resin portion.

(C15) In the exterior part of (C11), the refractive index of the structure color generation portion may be higher than the refractive index of the resin portion.

(C16) The exterior part of (C11) (a) may include a second structure color generation portion that is made of resin different from the resin of a first structure color generation portion serving as the structure color generation portion and has the minute shape formed therein, and (b) the assembly of the first structure color generation portion and the second structure color generation portion may be covered with the resin portion.

(C17) In the exterior part of (C11), the first structure color generation portion may be exposed from the second structure color generation portion.

The present invention may be achieved as the molding method described below other than the exterior part.

(C18) A molding method according to the present invention is (a) a molding method of molding an exterior part that configures the outer part of a product, including: (b) a first molding step of placing a part having a first surface with a minute shape formed thereon, light in a visible light range being produced from the minute shape by a physical phenomenon such as interference or diffraction with the incidence of light, in a mold having a second surface for forming the outer surface of the product so that the first surface and the second surface face each other, (c) a second molding step of closing the mold so as to have a space between the first surface and the second surface, and filling the space with a molding material having a light transmitting property after hardening, and (d) a third molding step of removing from the mold a molded product having the minute shape protected by the molding material as the exterior part.

(C19) The molding method of (C18) may include a fourth molding step of applying a compressive force to the molding material in a direction in which the first surface and the second surface face each other until the molding material hardens after filling with the molding material.

The present invention may be achieved as the product described below other than the exterior part.

(C20) A product according to the present invention has an exterior configured using the exterior part according to any one of (C1) to (C17) described above.

Advantage of the Invention

According to the present invention, the resin portion is placed on the outer surface of the product, and thus the structure color generation portion is protected by the resin portion and is not damaged. This can prevent a reduction in the preserving property of the structure color generation portion. The resin portion and the structure color generation portion are formed by molding, and thus the exterior part can be easily molded for a part having a complex surface shape at low cost, and the structure color generation portion with good design can be formed.

BEST MODE FOR CARRYING OUT THE INVENTION

Embodiment 1

Figure 1:
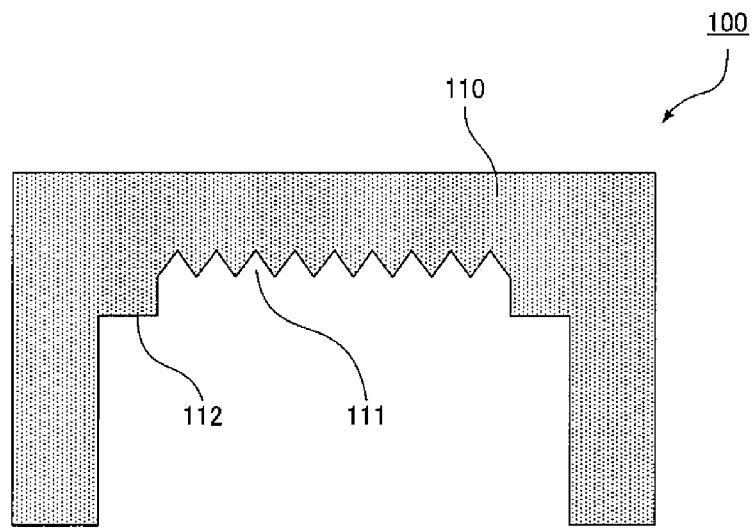
FIG. 1 is a sectional view of an exterior part according to Embodiment 1.

Embodiment 1 of the present invention will be described below.

<Outline>

An exterior part according to this embodiment includes features described in (C1) to (C6), (C9) and (C10) below.

(C1) The exterior part is (a) an exterior part that configures the outer part of a product, and includes (b) a resin portion that is made of resin having a light transmitting property and serves as the outer surface of the product, and (c) a structure color generation portion having formed therein a minute shape from which light in a visible light range is produced by a physical phenomenon such as interference or diffraction with the incidence of light, wherein (d) the resin portion and the structure color generation portion are formed by molding.

(C2) The minute shape of the structure color generation portion is formed by a periodic structure in which the same shape is repeated in a region having one side of 80 μm as a minimum light emitting unit.

(C3) The minute shape of the structure color generation portion is peaks and troughs.

(C4) The minute shape of the structure color generation portion has an interval of 0.4 to 0.7 μm between the troughs or the peaks.

(C5) The minute shape of the structure color generation portion has a draft angle of 6° to 82° for molding.

(C6) The minute shape of the structure color generation portion has a height of 0.05 to 3.3 μm, and the height is ten times or less than an interval between a peak and a trough.

(C9) In the exterior part, the resin portion and the structure color generation portion are the same, and the minute shape is formed on the inner surface of the resin portion.

(C10) In the exterior part, a step is formed on a periphery of the structure color generation portion so as to protrude inward of the product rather than the structure color generation portion.

A molding method of the exterior part of this embodiment has a feature described in (C18) below.

(C18) The molding method is (a) a molding method of molding an exterior part that configures the outer part of a product, including: (b) a first molding step of placing a part having a first surface with a minute shape formed thereon, light in a visible light range being produced from the minute shape by a physical phenomenon such as interference or diffraction with the incidence of light, in a mold having a second surface for forming the outer surface of the product so that the first surface and the second surface face each other, (c) a second molding step of closing the mold so as to have a space between the first surface and the second surface, and filling the space with a molding material having a light transmitting property after hardening, and (d) a third molding step of removing from the mold a molded product having the minute shape protected by the molding material as the exterior part.

The molding method of the exterior part according to this embodiment may further have a feature described in (C19) below.

(C19) The molding method of (C18) includes a fourth molding step of applying a compressive force to the molding material in a direction in which the first surface and the second surface face each other until the molding material hardens after filling with the molding material.

A product according to this embodiment may have an exterior configured using the exterior part according to any one of (C1) to (C6), (C9) and (C10) described above.

Based on the above points, this embodiment will be described with reference to the drawings.

<Exterior Part>

First, an exterior part according to this embodiment will be described.

As shown in FIG. 1, an exterior part 100 configures the outer part of a product, and includes a resin portion 110 made of a resin material having a light transmitting property after hardening.

The resin portion 110 has an inverted U-section, a surface on a protruding side thereof (hereinafter referred to as a protruding surface) corresponding to the outer surface of the product, and a surface on a recessed side thereof (hereinafter referred to as a recessed surface) corresponding to the inner surface of the product. Further, on the recessed surface, that is, the inner surface of the product, a structure color generation region 111 and steps 112 are formed. The structure color generation region 111 is formed in the center portion of the recessed surface and the steps 112 are formed at opposite corners of the recessed surface.

Specifically, the resin portion 110 forms the outer surface of the product, and is also a structure color generation portion having the structure color generation region 111 formed on the inner surface of the product.

The structure color generation region 111 is a minute irregular portion formed by a periodic structure having a certain shape on the recessed surface of the resin portion 110. Thus, the interference or diffraction of reflected light or transmitted light occurs with the incidence of light. At this time, if an interval between troughs or peaks in the periodic structure is 0.4 to 0.7 μm, light in a visible light range perceptible to a human is produced to have an influence on coloring.

For example, it is assumed that the resin portion 110 is made of a material having high transparency, and the structure color generation region 111 is formed by a wavy periodic structure having an interval of 0.7 μm between troughs. In this case, the structure color generation region 111 provides almost red coloring with a narrow viewing angle. Further, if the resin portion 110 is colored while maintaining a light transmitting property, the structure color generation region 111 produces a different color by an action with the color of the resin portion 110.

The step 112 is formed around the structure color generation region 111. Further, in the drawing, the step 112 protrudes downward of the structure color generation region 111.

<Product>

Next, the product using the exterior part will be described. Herein, the exterior part 100 is used in a portable audio device by way of example.

Figure 2:
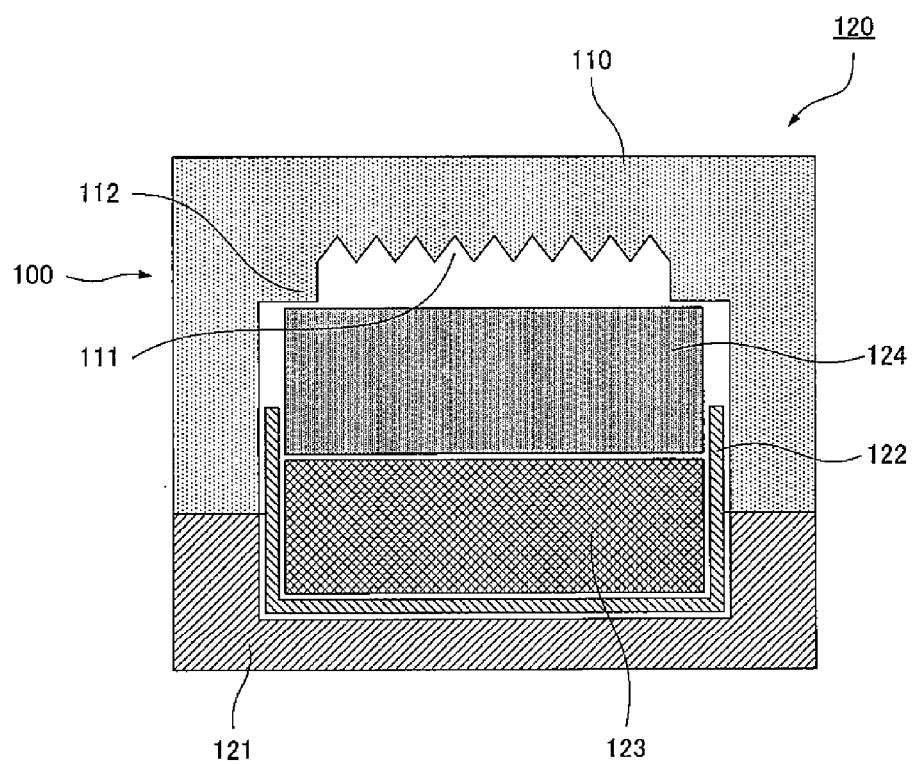
FIG. 2 is a sectional view of a product using the exterior part according to Embodiment 1.

As shown in FIG. 2, a portable audio device 120 includes an exterior part 100, an exterior part 121 on a bottom side thereof (lower side in the drawing), a chassis 122, and a recording and reproducing mechanism 123 assembled together.

Specifically, the exterior part 100 and the exterior part 121 on the bottom side are assembled so that the recessed surface of the exterior part 121 on the bottom side and the recessed surface of the exterior part 100 face each other. The recording and reproducing mechanism 123 mounted on the chassis 122 is incorporated into a space created by the exterior part 100 and the exterior part 121 on the bottom side assembled together. Further, a recording medium 124 is inserted into a space created between the exterior part 100 and the recording and reproducing mechanism 123.

Thus, the structure color generation region 111 is provided on the inner side of the product rather than on the outer surface, and is thus not rubbed with hands and worn. However, when an included part such as the recording medium 124 moves, in the absence of the step 112, the structure color generation region 111 may be damaged by an external force applied by the included part. Specifically, the step 112 is provided to create a gap between the structure color generation region 111 and the recording medium 124, thereby preventing the structure color generation region 111 from being damaged by an external force applied by the included part such as the recording medium 124.

<Molding Step>

Next, a molding step of producing the exterior part 100 using a screw injection molding machine will be described.

Figure 3:
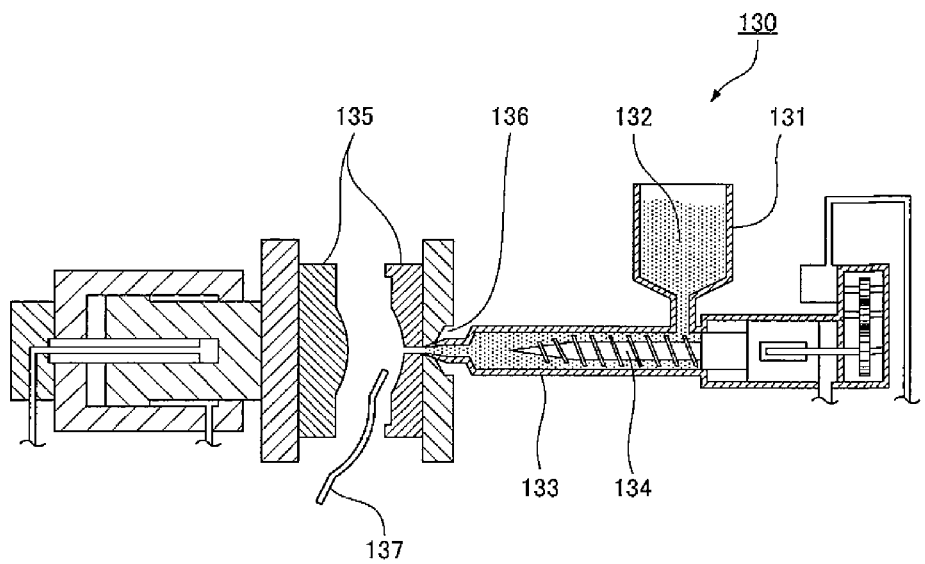
FIG. 3 is a configuration diagram of a screw injection molding machine for performing a molding method of the exterior part according to Embodiment 1.

As shown in FIG. 3, a molding material 132 is first put in a hopper 131 of a screw injection molding machine 130. The molding material 132 put in the hopper 131 falls from the hopper 131 into a heating cylinder 133 by its own weight. The molding material 132 having fallen into the heating cylinder 133 is mixed by rotation of a screw 134, and fed to a tip of the heating cylinder 133. When being fed toward the tip of the heating cylinder 133, the molding material 132 is melted by heating with the heater of the heating cylinder 133 and friction heat by mixing.

Then, the exterior part 100 (a molded product 137 in the drawing) is produced by an injection step described in (Step 1) to (Step 5) below.

(Step 1) A mold 135 is closed.

(Step 2) The melted molding material 132 is injected from a tip of a nozzle 136 into the mold 135 under high pressure.

(Step 3) The molding material 132 injected into the mold 135 is cooled and hardened.

(Step 4) When cooling is finished, the mold 135 is opened.

(Step 5) The cooled molding material 132 (molded product 137 in the drawing) is removed from the mold 135. The molded product 137 removed from the mold 135 is the exterior part 100.

The injection step in (Step 1) to (Step 5) is hereinafter repeated.

<Mold>

Next, a mold used for producing the exterior part will be described.

Figure 4:
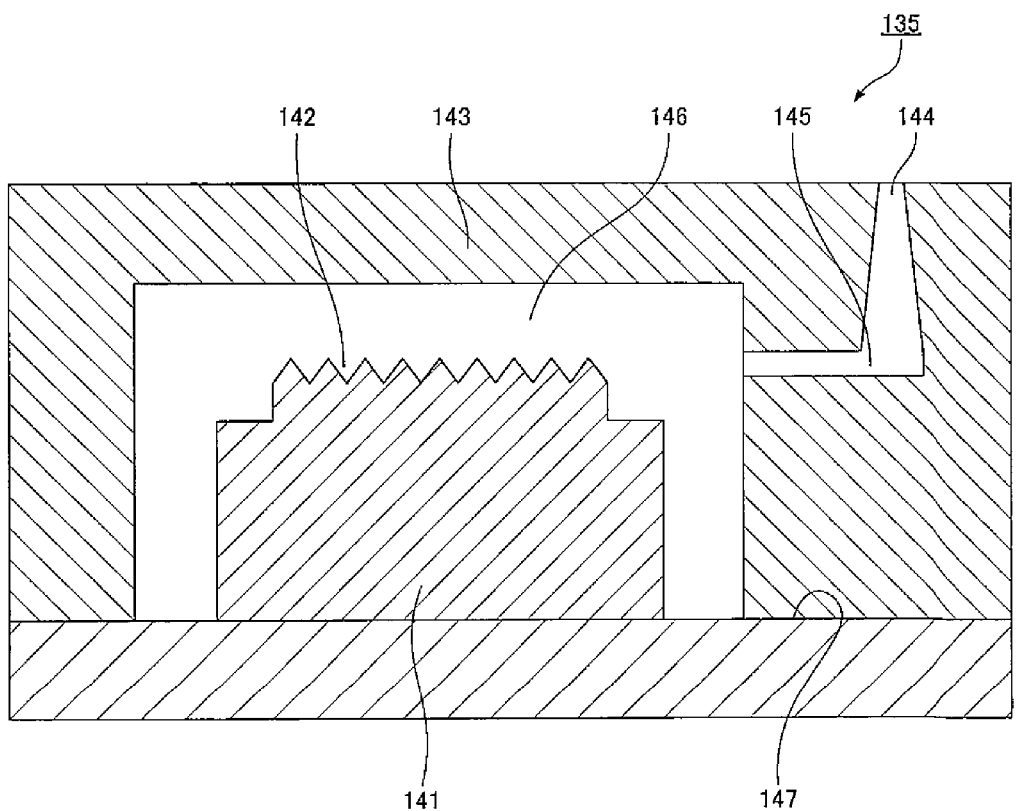
FIG. 4 is a sectional view of a mold mounted on the injection molding machine according to Embodiment 1.

As shown in FIG. 4, the mold 135 is constituted by a male mold 141 and a female mold 143. The male mold 141 has a minute irregular portion 142 formed therein for forming the structure color generation region 111 on the recessed surface of the resin portion 110 shown in FIG. 1. The female mold 143 has a spool 144 and a runner 145 formed therein for connecting the outside and the inside of the mold.

The male mold 141 has a protruding surface formed therein for forming the recessed surface of the resin portion 110. The female mold 143 has a recessed surface formed therein for forming the protruding surface of the resin portion 110.

The tip of the nozzle 136 shown in FIG. 3 is connected to the spool 144. The molding material 132 may be thermoplastic methacrylic resin (acrylic resin). In this case, it is preferable that a cylinder temperature is 230° C. and a mold temperature is 60° C.

For example, in the molding step, the male mold 141 and the female mold 143 are assembled so that the protruding surface of the male mold 141 and the recessed surface of the female mold 143 face each other. The melted molding material 132 flows into the mold through the spool 144. The molding material 132 having flowed through the spool 144 passes through the runner 145 and fills a product portion 146 that is a cavity.

The molding material 132 is not completely injected into the minute irregular portion 142 and a gap is easily created. In this state, the shape of the minute irregular portion 142 is not sufficiently transferred. This is because the size of the minute shape of the structure color generation region 111 is equivalent to the size of a pit in a recording medium such as a compact disk or a digital video disk, or the irregular shape of a plastic lens having a diffraction grating.

Thus, an injection compression molding method used for such a precision molded product is applied in the molding step. Thus, the transfer result of the minute irregular portion 142 can be obtained satisfactorily without creating a gap.

The injection compression molding method is, for example, a molding method of performing (Step 1) to (Step 3) described below.

(Step 1) In the first half of the molding step, a mold clamping force is kept low.

(Step 2) The molding material 132 is injected into the product portion 146 with a divided surface portion 147 of the mold 135 slightly opened.

(Step 3) The mold 135 is closed by a full mold clamping force. This applies a compressive force in a direction in which the protruding surface of the male mold 141 and the recessed surface of the female mold 143 face each other.

<Irregular Portion>

Next, the minute irregular portion 142 will be described.

Figure 5:
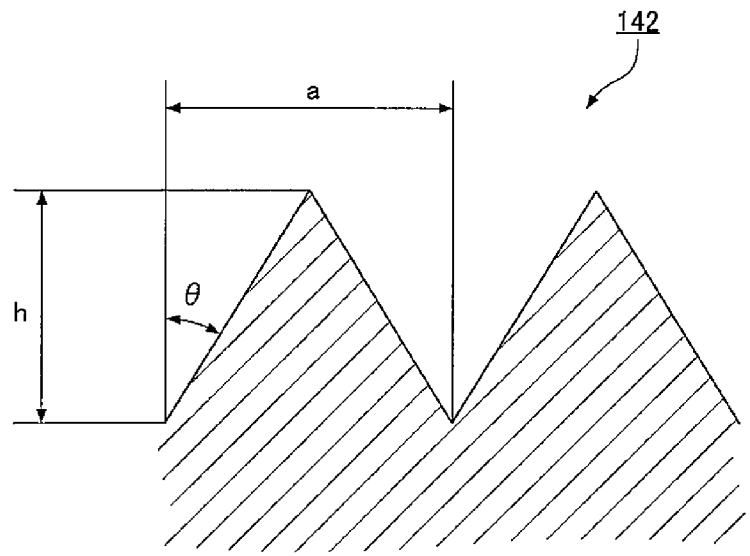
FIG. 5 is an enlarged view of a minute irregular portion formed on a male mold according to Embodiment 1.

As shown in FIG. 5, the minute irregular portion 142 is formed by a periodic structure having a certain shape. Herein, the minute irregular portion 142 is formed by a wavy periodic structure having an interval a of 0.4 to 0.7 μm (hereinafter referred to as a pitch a) between troughs. The pitch a may be an interval between peaks.

Since it is said that the resolution of the naked eye is about 100 μm, a minimum light emitting unit has to be at least 80 μm. Further, for coloring in a region having one side of 80 μm as a minimum light emitting unit, interference or diffraction needs to occur in the region. Thus, a periodic structure is required in which the same shape is repeated in the region having one side of 80 μm.

To increase coloring efficiency, it is effective that flat portions irrelevant to interference or diffraction are minimized in the minute irregular portion 142, and peaks and troughs having vertexes are provided instead of the flat portions.

Generally, a standard draft angle for easily removing a molded product from a mold is about 2° to 1°. An inclination angle θ of the minute irregular portion 142 may be 5° or more in view of a viewing angle of a human seeing the exterior part 100. A height h of the minute irregular portion 142 is 0.05 μm at the minimum that is a process limitation in view of the accuracy of machining. At this time, an inclination angle θ formed at a maximum pitch (0.7 μm) is 82° at the maximum.

Molding can be performed when an aspect ratio that is a ratio of a height to an interval between the peak and the trough (half of the pitch) is 10 or less. Thus, when the pitch a is 0.7 μm and the inclination angle θ is 6°, the height h is 3.3 μm at the maximum. The inclination angle θ is larger than a general draft angle, and thus such a shape can be transferred also by molding.

The shape of the periodic structure of the minute irregular portion 142 is a wave shape, but may be a conical shape, a pyramidal shape, or a semispherical shape.

In this embodiment, as a method of obtaining a molded product, a method may be adopted in which a sheet material is compression molded in a thickness direction as in nanoimprinting. For example, thermoplastic methacrylate resin (acrylic resin) is heated to 140° C. and pressurized under stress of 10 MPa. This allows the minute irregular portion 142 to be transferred satisfactorily.

<Variation 1>

Figure 6:
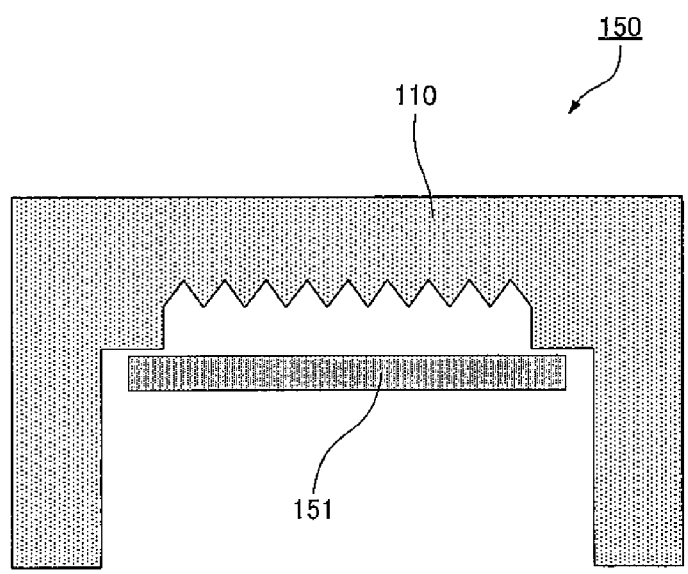
FIG. 6 is a sectional view of an exterior part according to Variation 1 of Embodiment 1.

Like an exterior part 150 shown in FIG. 6, an aluminum metal reflector plate 151 may be placed on the side of the recessed surface of the resin portion 110. Thus, light incident on the side of the protruding surface (upper side in the drawing) of the resin portion 110 is efficiently reflected by the metal reflector plate 151. Then, luminance is increased for coloring of the structure color generation region 111.

<Variation 2>

Figure 7:
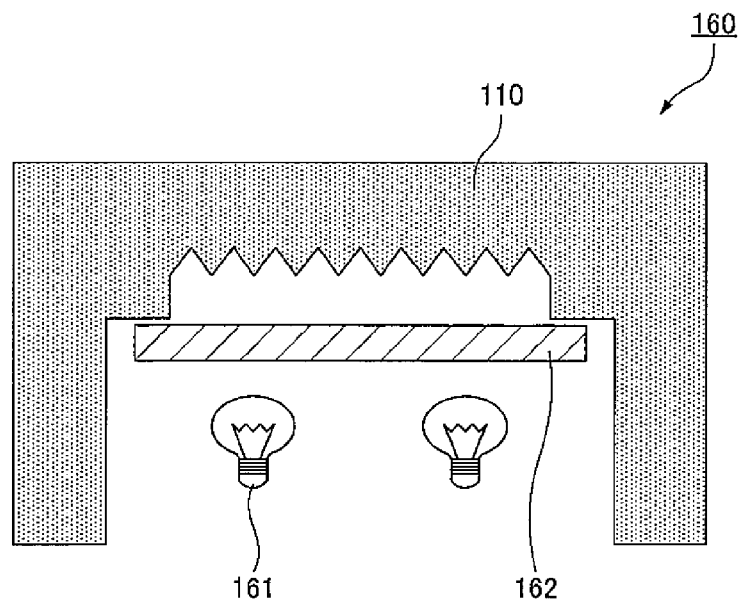
FIG. 7 is a sectional view of an exterior part according to Variation 2 of Embodiment 1.

As in an exterior part 160 shown in FIG. 7, a light source 161 and a light diffusing plate 162 may be placed on the side of the recessed surface (lower side in the drawing) of the exterior part 100. Thus, light emitted from the light source 161 is made uniform by the light diffusing plate 162 and applied to the resin portion 110. Thus, luminance is further increased for coloring of the structure color generation region 111.

Embodiment 2

Now, Embodiment 2 according to the present invention will be described.

<Outline>

An exterior part according to this embodiment has the following features.

(C11) In the exterior part, a structure color generation portion is made of resin different from the resin of a resin portion, and covered with the resin portion.

(C12) In the exterior part, a minute shape is formed on the surface of the structure color generation portion in contact with the resin portion.

(C13) The softening temperature of the structure color generation portion is higher than the softening temperature of the resin portion.

(C14) The reflectivity of the structure color generation portion is higher than the reflectivity of the resin portion.

(C15) The refractive index of the structure color generation portion is higher than the refractive index of the resin portion.

The exterior part according to this embodiment may further have features described in (C16) and (C17) below.

(C16) The exterior part includes (a) a second structure color generation portion that is made of resin different from the resin of a first structure color generation portion serving as the structure color generation portion and has the minute shape formed therein, and (b) the assembly of the first structure color generation portion and the second structure color generation portion is covered with the resin portion.

(C17) The first structure color generation portion is exposed from the second structure color generation portion.

A product according to this embodiment may have an exterior configured using the exterior part according to any one of (C11) to (C17) described above.

Based on the above points, this embodiment will be described with reference to the drawings. The same components as those in Embodiment 1 will be denoted by the same reference numerals and descriptions thereof will be omitted.

<Exterior Part>

First, the exterior part according to this embodiment will be described.

Figure 8:
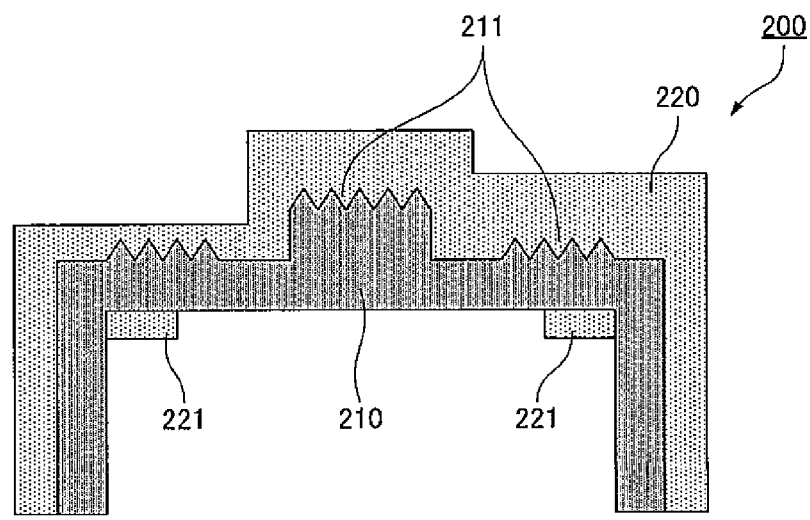
FIG. 8 is a sectional view of an exterior part according to Embodiment 2.

As shown in FIG. 8, an exterior part 200 includes a structure color generation portion 210 having a structure color generation region 211 formed therein, and a resin portion 220 having a light transmitting property.

In the exterior part 200, lock portions 221 connected to the resin portion 220 protrude at opposite corners on the inside of the structure color generation portion 210 having an inverted U-section, and the structure color generation portion 210 is held by the lock portion 221. The outer surface of the structure color generation portion 210 is covered with the resin portion 220.

In the structure color generation portion 210, the center portion on the upper surface protrudes, and the structure color generation regions 211 are formed on the center portion and opposite side portions one step lower than the center portion, respectively. The structure color generation region 211 is a minute irregular portion formed by a periodic structure having a certain shape on the protruding surface of the structure color generation portion 210 like the structure color generation region 111 described in Embodiment 1.

The structure color generation portion 210 is placed so that the surface on which the structure color generation region 211 is formed faces the protruding surface of the exterior part 200 (outer surface of the product).

In the resin portion 220, the center portion on the upper surface protrudes, a right portion is one step lower than the center portion, and a left portion is one step lower than the right portion.

Herein, the exterior part 200 is produced by a rotary two-color molding method described in (Step 1) to (Step 4) below by way of example.

(Step 1) A molding material for the structure color generation portion 210 is injection molded from a first cylinder. At this time, a male mold having a protruding surface formed therein for forming the recessed surface of the structure color generation portion 210 and a female mold having a recessed surface formed therein for forming the protruding surface of the structure color generation portion 210 are used. The first cylinder is placed on the side of the female mold.

(Step 2) The mold is once opened, and a mold turntable is rotated 180° with the structure color generation portion 210 attached to the male mold. Thus, the female mold is changed.

(Step 3) A molding material for the resin portion 220 is injection molded from a second cylinder. At this time, a female mold having a recessed surface formed therein for forming the protruding surface of the resin portion 220 is used. Further, the resin portion 220 is molded to have a structure in which the lock portions 221 connected to the resin portion 220 hold the structure color generation portion 210. The second cylinder is placed on the side of the female mold.

(Step 4) The mold is again opened, and the exterior part 200 having the structure color generation portion 210 and the resin portion 220 integrated is removed from the mold.

The molding material for the structure color generation portion 210 is preferably polycarbonate resin, and the molding material for the resin portion 220 is preferably methacrylate resin (acrylic resin). For the structure color generation portion 210 (polycarbonate resin), a cylinder temperature is preferably 280° C. and a mold temperature is preferably 100° C. A deflection temperature under load of 1.81 MPa is 130° C. to 138° C. For the resin portion 220 (methacrylate resin), a cylinder temperature is preferably 230° C. and a mold temperature is preferably 60° C. A deflection temperature under load of 1.81 MPa is 60° C. to 88° C.

When the above-described material is used, the structure color generation portion 210 is only slightly softened at a mold temperature of 60° C. Specifically, the softening temperature of the structure color generation portion 210 is higher than the softening temperature of the resin portion 220, and thus the minute shape of the structure color generation region 211 is held in molding of the resin portion 220.

The refractive index of the structure color generation portion 210 (polycarbonate resin) is 1.58 to 1.59, the refractive index of the resin portion 220 (methacrylate resin) is 1.49 to 1.50, and the refractive index of the polycarbonate resin is higher than the refractive index of the methacrylate resin. Thus, light incident from the outside of the resin portion 220 is reflected by an interface between the structure color generation portion 210 and the resin portion 220. This can cause coloring of the structure color generation region 211. The same applies to reflectivity specified by the refractive index.

In molding of the resin portion 220, the structure color generation portion 210 is in contact with the mold. After molding the resin portion 220, a portion of the structure color generation portion 210 in contact with the mold is exposed. If the structure color generation portion 210 and the resin portion 220 are simply bonded to each other, the portions may be delaminated, which causes trouble holding a joining property. Thus, the resin portion 220 is molded to have the structure in which the lock portions 221 connected to the resin portion 220 hold the structure color generation portion 210. Thus, the structure color generation portion 210 and the resin portion 220 are integrated to provide a firm joining property. The resin portion 220 covers the structure color generation portion 210 to protect the structure color generation region 211 from damage such as wear. Further, a firmer joining property can be obtained between the structure color generation portion 210 and the resin portion 220 by an anchor effect caused by the minute shape of the structure color generation region 211.

With the injection molding, the structure color generation region 211 can be easily formed on the complex exterior part 200 having an irregular outer surface as shown in FIG. 8. Further, as shown in FIG. 8, the structure color generation regions 211 are provided having different depths in the thickness direction of the exterior part 200, thereby providing a change in color and design in the depth direction.

The structure color generation portion 210 may be made of a metallic molding material including a small piece of aluminum. This increases reflectivity by the structure color generation portion 210 and provides further satisfactory coloring by the structure color generation region 211.

<Product>

Next, the product using the exterior part 200 will be described. Herein, the exterior part 200 is used in a portable audio device by way of example.

Figure 9:
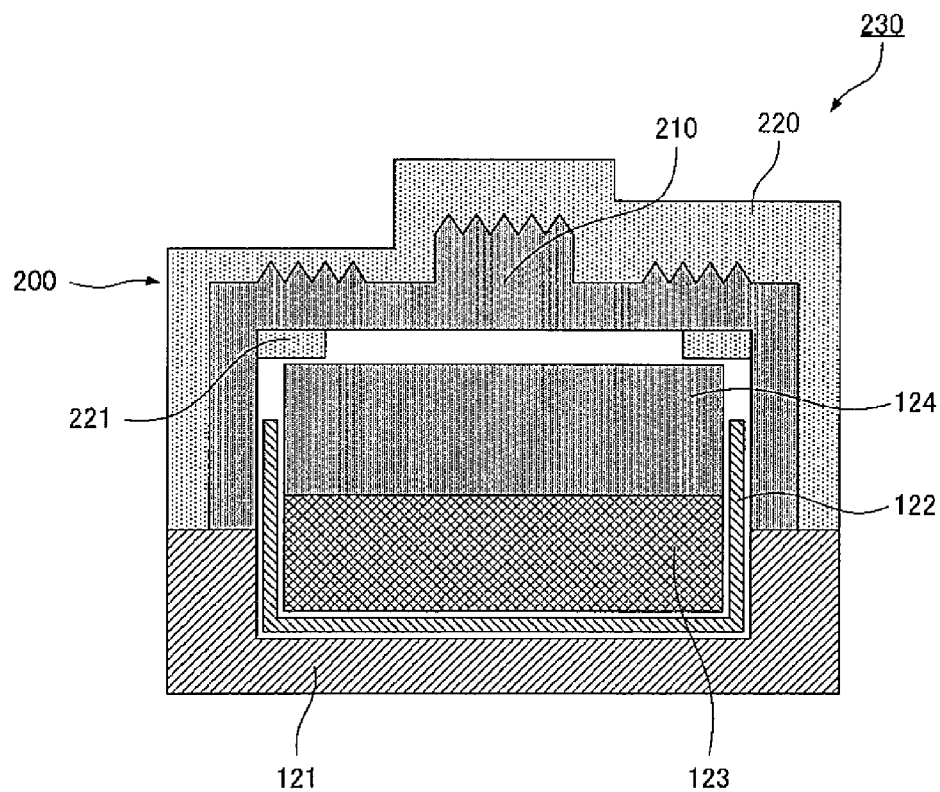
FIG. 9 is a sectional view of a product using the exterior part according to Embodiment 2.

As shown in FIG. 9, a portable audio device 230 is assembled using the exterior part 200 instead of the exterior part 100 shown in FIG. 2. A recording medium 124 is inserted at a distance from the lock portions 221 of the resin portion 220 so as not to press the lock portions 221 of the resin portion 220. The structure color generation regions 211 are formed having different depths in the thickness direction of the exterior part 200, thereby providing a change in color as well as design in the depth direction.

<Variation>

A variation of the exterior part 200 according to this embodiment will be described.

Figure 10:
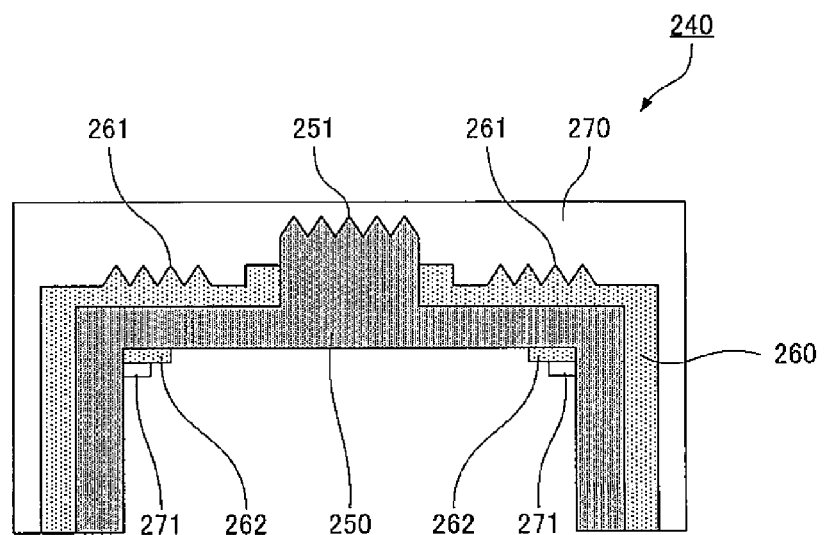
FIG. 10 is a sectional view of an exterior part according to a variation of Embodiment 2.

As shown in FIG. 10, an exterior part 240 includes a first structure color generation portion 250 having a structure color generation region 251 formed therein, a second structure color generation portion 260 having a structure color generation region 261 formed therein, and a resin portion 270 having a light transmitting property. The outer surface other than the center portion protruding of the first structure color generation portion 250 is covered with the second structure color generation portion 260, and the center portion protruding of the first structure color generation portion 250 and the outer surface of the second structure color generation portion 260 are covered with the resin portion 270.

In the exterior part 240, lock portions 262 connected to the second structure color generation portion 260 protrude at opposite corners on the inside of the first structure color generation portion 250 having an inverted U-section, and the first structure color generation portion 250 is held by the lock portions 262. Further, lock portions 271 connected to the resin portion 270 protrude on the lower side of the lock portions 262, and a molded product having the first structure color generation portion 250 and the second structure color generation portion 260 integrated is held by the lock portions 271.

The first structure color generation portion 250 protrudes at the center portion on the upper surface, and the structure color generation region 251 is formed on the protruding center portion. The structure color generation region 251 is a minute irregular portion formed by a periodic structure having a certain shape on the protruding surface of the first structure color generation portion 250 like the structure color generation region 111 described in Embodiment 1.

The first structure color generation portion 250 is placed so that the surface with the structure color generation region 251 formed thereon faces the protruding surface of the exterior part 240 (outer surface of the product).

In the second structure color generation portion 260, the structure color generation regions 261 are respectively formed on a left peripheral portion and a right peripheral portion on the upper surface surrounding the protruding center portion of the first structure color generation portion 250. Specifically, the structure color generation region 251 protrudes from the second structure color generation portion 260 and is exposed, and the structure color generation regions 261 are formed on opposite sides thereof. The structure color generation region 261 is a minute irregular portion formed by a periodic structure having a certain shape on the protruding surface of the second structure color generation portion 260 like the structure color generation region 251.

The second structure color generation portion 260 is placed so that the surface with the structure color generation region 261 formed thereon faces the protruding surface of the exterior part 240 (outer surface of the product).

The structure color generation region 261 may be formed by the same periodic structure as the structure color generation region 251 or a different periodic structure therefrom.

Herein, the exterior part 240 is produced by a molding step described in (Step 1) to (Step 4) below by way of example.

(Step 1) By the above-described rotary two-color molding method, a molded product having the first structure color generation portion 250 and the second structure color generation portion 260 integrated is injection molded. At this time, the molded product is molded to have a structure in which the lock portions 262 connected to the second structure color generation portion 260 hold the first structure color generation portion 250.

(Step 2) The molded product having the first structure color generation portion 250 and the second structure color generation portion 260 integrated is placed in a mold. At this time, the molded product is provided so that the resin portion 270 is formed on the side of the protruding surface of the second structure color generation portion 260.

(Step 3) A molding material for the resin portion 270 is injection molded. At this time, a female mold having a recessed surface therein for forming the protruding surface of the resin portion 270 is used. Further, the resin portion 270 is molded to have a structure in which the lock portions 271 connected to the resin portion 270 hold the molded product having the first structure color generation portion 250 and the second structure color generation portion 260 integrated.

(Step 4) The exterior part 240 that includes the molded product having the first structure color generation portion 250 and the second structure color generation portion 260 integrated therein and the resin portion 270 covering the molded product, is removed from the mold.

A molding material for the first structure color generation portion 250 is preferably polycarbonate resin, and the molding material for the second structure color generation portion 260 and the resin portion 270 is preferably methacrylate resin (acrylic resin). For the first structure color generation portion 250 (polycarbonate resin), a cylinder temperature is preferably 280° C., and a mold temperature is preferably 100° C. For the second structure color generation portion 260 (methacrylate resin), a cylinder temperature is preferably 230° C. and a mold temperature is preferably 80° C. For the resin portion 270 (methacrylate resin), a cylinder temperature is 210° C. and a mold temperature is 60° C.

As described above, the exterior part 200 includes the first structure color generation portion 250 having the structure color generation region 251 formed therein, the second structure color generation portion 260 having the structure color generation region 261 formed therein, the structure color generation portions being laminated in multiple layers, and the resin portion 270 having a light transmitting property and covering the laminated portions. Thus, a combination of a color of the molding material for the first structure color generation portion 250, a color of the molding material for the second structure color generation portion 260, and coloring by the structure color generation regions 251 and 261 can provide more complex design.

Embodiment 3

Now, Embodiment 3 according to the present invention will be described.
<Exterior Part>

First, an exterior part according to this embodiment will be described.

Figure 11:
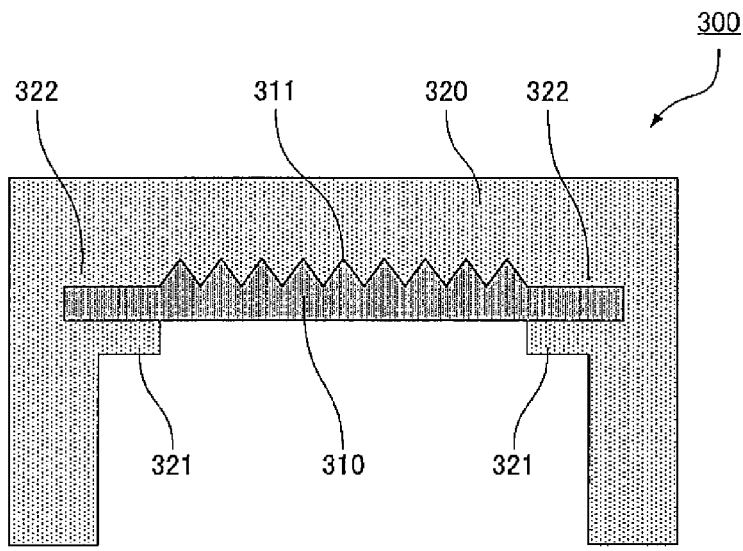
FIG. 11 is a sectional view of an exterior part according to Embodiment 3.

As shown in FIG. 11, an exterior part 300 includes a copper metal part 310 having a structure color generation region 311 formed therein, and a resin portion 320 having a light transmitting property.

In the exterior part 300, lock portions 321 protrude from the inner side surfaces toward the center on opposite side surfaces on the inside of the resin portion 320 having an inverted U-section. Further, opposite ends of the plate-shaped copper metal part 310 are interposed between the lock portions 321 and opposite corner portions 322 on the inside of the resin portion 320, and the copper metal part 310 is secured to the resin portion 320. With a portion in contact with a mold in the lower surface of the copper metal part 310 during molding exposed from the resin portion 320, the copper metal part 310 is surrounded by the resin portion 320.

The copper metal part 310 is placed so that the surface with the structure color generation region 311 formed thereon faces the protruding surface of the exterior part 300 (outer surface of a product).

The structure color generation region 311 is a minute irregular portion formed by a periodic structure having a certain shape on the surface side (upper side in the drawing) of the copper metal part 310 like the structure color generation region 111 described in Embodiment 1.

Herein, the exterior part 300 is produced by insert molding described in (Step 1) to (Step 3) below by way of example.

(Step 1) The copper metal part 310 is placed in the mold.

(Step 2) Methacrylate resin is injection molded. At this time, the copper metal part 310 is surrounded by the methacrylate resin (resin portion 320).

(Step 3) The exterior part 300 having the copper metal part 310 and the methacrylate resin (resin portion 320) surrounding the copper metal part 310 integrated is removed from the mold.

The structure color generation region 311 is formed on the copper metal part 310, and thus the structure color generation region 311 is not damaged by the injection temperature of the methacrylate resin.

The surface of the copper metal part 310 is metallic finished to provide satisfactory coloring.

Insert molding may be performed using a metal part other than the copper metal part 310 or a part made of a different material.

Embodiment 4

Now, Embodiment 4 according to the present invention will be described.
<Exterior Part>

First, an exterior part according to this embodiment will be described.

Figure 12:
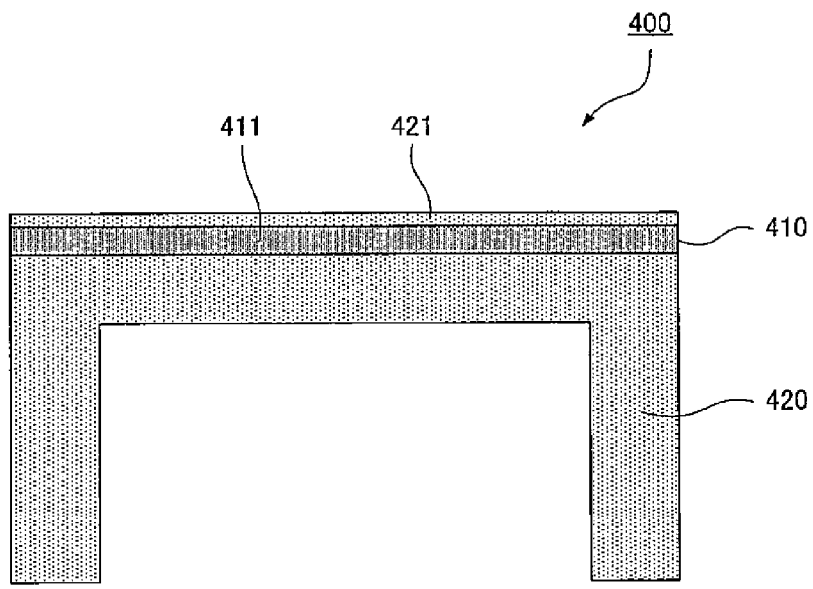
FIG. 12 is a sectional view of an exterior part according to Embodiment 4.
Figure 13:
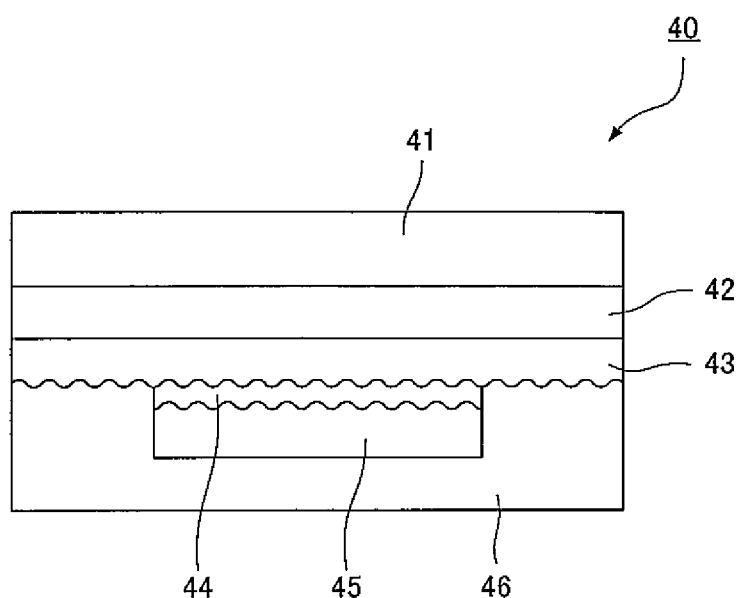
FIG. 13 is a sectional view of a transfer sheet according to the prior art.

As shown in FIG. 12, an exterior part 400 includes a polycarbonate sheet part 410 having a structure color generation region 411 formed therein and a first resin portion 420 and a second resin portion 421 each having a light transmitting property.

In the exterior part 400, the first resin portion 420 having an inverted U-section is formed on the lower surface side of the polycarbonate sheet part 410, and a molding material for the first resin portion 420 is slightly fed toward the upper surface side of the polycarbonate sheet part 410 to form the thin second resin portion 421. Specifically, the first resin portion 420 and the second resin portion 421 cover the polycarbonate sheet part 410.

In the polycarbonate sheet part 410, the structure color generation region 411 is formed by nanoimprinting according to desired design. The structure color generation region 411 is a minute irregular portion formed by a periodic structure having a certain shape on the polycarbonate sheet part 410 like the structure color generation region 111 described in Embodiment 1.

Herein, the exterior part 400 is produced by a molding step described in (Step 1) to (Step 4) below using a molding transfer system by way of example.

(Step 1) The polycarbonate sheet part 410 is inserted into an open mold and positioned.

(Step 2) Mold clamping is performed, and the polycarbonate sheet part 410 is brought into tight contact with a female mold by vacuum suction.

(Step 3) Methacrylate resin is injection molded. At this time, the molding material is slightly fed toward the upper surface side (upper side in the drawing) of the polycarbonate sheet part 410 to form the second resin portion 421. Thus, the polycarbonate sheet part 410 is covered with the second resin portion 421, and the structure color generation region 411 formed on the polycarbonate sheet part 410 is protected from damage such as wear.

(Step 4) The exterior part 400 having the first resin portion 420, the second resin portion 421, and the polycarbonate sheet part 410 integrated is removed from the mold.

For the minute shape of the structure color generation region 411, through holes having a distance of 0.4 to 0.7 μm between the center of a hole and the center of an adjacent hole may be formed instead of minute irregularities. This allows for coloring of the structure color generation region 411 by diffraction.

INDUSTRIAL APPLICABILITY

The present invention can be used as an exterior part that configures the outer part of a product and particular, as an exterior part that provides a decorative effect to the product.

The invention claimed is:

1. An exterior part configuring an outer part of a product, comprising:
    a resin portion that is made of resin having a light transmitting property and serves as an outer surface of the product; and
    a structure color generation portion provided with a minute shape from which light in a visible light range is produced by interference or diffraction of incident light, the structure color generation portion being made of resin different from the resin of the resin portion, the structure color generation portion having a surface in contact with the resin portion, and the minute shape being formed on the surface in contact with the resin portion; and
    lock portions connected to the resin portion, the lock portions holding the structure color generation portion,
    wherein the resin portion, the structure color generation portion and the lock portions are formed by molding.

2. The exterior part according to claim 1, wherein a softening temperature of the structure color generation portion is higher than a softening temperature of the resin portion.

3. The exterior part according to claim 1, wherein reflectivity of the structure color generation portion is higher than reflectivity of the resin portion.

4. The exterior part according to claim 1, wherein a refractive index of the structure color generation portion is higher than a refractive index of the resin portion.

5. The exterior part according to claim 1, further comprising a second structure color generation portion that is made of resin different from the resin of a first structure color generation portion serving as the structure color generation portion, the second structure color generation portion having a minute shape formed therein, and light in a visible light range being produced from the minute shape of the second structure color generation portion by interference or diffraction of incident light,
    wherein an assembly of the first structure color generation portion and the second structure color generation portion is covered with the resin portion.

6. The exterior part according to claim 5, wherein the first structure color generation portion is exposed from the second structure color generation portion.

7. A product having an exterior configured using the exterior part according to claim 1.

* * * * *